United States Patent [19]

Krueger et al.

[11] Patent Number: 6,098,086
[45] Date of Patent: Aug. 1, 2000

[54] JAPANESE TEXT INPUT METHOD USING A LIMITED ROMAN CHARACTER SET

[75] Inventors: Mark Henry Krueger, Fukuoka, Japan; Kevin Daniel Neeson, San Francisco, Calif.

[73] Assignee: WebTV Networks, Inc., Mountain View, Calif.

[21] Appl. No.: 08/909,182

[22] Filed: Aug. 11, 1997

[51] Int. Cl.$^7$ .................................................. G06F 17/00
[52] U.S. Cl. ...................... 707/535; 707/501; 707/101; 707/102; 707/200
[58] Field of Search .................... 345/168–179; 341/22–28; 707/1–542

[56] References Cited

U.S. PATENT DOCUMENTS

| | | | |
|---|---|---|---|
| 4,737,040 | 4/1988 | Moon | 400/82 |
| 5,109,352 | 4/1992 | O'Dell | 707/542 |
| 5,128,672 | 7/1992 | Kaehler | 345/168 |
| 5,457,454 | 10/1995 | Sugano | 345/179 |

OTHER PUBLICATIONS

Ken Lunde, Understanding Japanese Information Processing, O'Relly & Associates, pp. 22–23, 1993.

*Primary Examiner*—Thomas G. Black
*Assistant Examiner*—David Yiuk Jung
*Attorney, Agent, or Firm*—Workman, Nydegger & Seeley

[57] ABSTRACT

A Japanese character processing system containing a roman character keyboard containing a plurality of keys arranged in one or more rows. A first set of roman character consonants is provided in one row, a second set of roman character consonants is provided in a second row, and a set of roman character vowels is provided in a third row. The processing system converts a valid consonant-vowel combination into a corresponding Japanese character upon the entry of a valid consonant vowel combination and displays the Japanese character on a display device coupled to the processing system.

33 Claims, 12 Drawing Sheets

| A | I | U | E | O |
|---|---|---|---|---|
| KA | KI | KU | KE | KO |
| GA | GI | GU | GE | GO |
| SA | SHI | SU | SE | SO |
| ZA | JI | ZU | ZE | ZO |
| TA | CHI | TSU | TE | TO |
| DA | DI | DU | DE | DO |
| NA | NI | NU | NE | NO |
| HA | HI | FU | HE | HO |
| BA | BI | BU | BE | BO |
| PA | PI | PU | PE | PO |
| MA | MI | MU | ME | MO |
| YA | (yi) | YU | (ye) | YO |
| RA | RI | RU | RE | RO |
| WA | (wi) | ..... | (we) | WO |
| N | ..... | ..... | ..... | ..... |

TABLE 1

FIG. 1

|     | YA  | YU  | YO  |
| --- | --- | --- | --- |
| KI  | KYA | KYU | KYO |
| GI  | GYA | GYU | GYO |
| SHI | SHA | SHU | SHO |
| JI  | JA  | JU  | JO  |
| CHI | CHA | CHU | CHO |
| NI  | NYA | NYU | NYO |
| HI  | HYA | HYU | HYO |
| BI  | BYA | BYU | BYO |
| MI  | MYA | MYU | MYO |
| RI  | RYA | RYU | RYO |

TABLE 2

FIG. 2

|  |  | A | I | U | E | O |
|---|---|---|---|---|---|---|
| A |  | あ | い | う | え | お |
| K |  | か | き | く | け | こ |
| S |  | さ | し | す | せ | そ |
| T |  | た | ち | つ | て | と |
| N |  | な | に | ぬ | ね | の |
| H |  | は | ひ | ふ | へ | ほ |
| M |  | ま | み | む | め | も |
| Y |  | や | -- | ゆ | -- | よ |
| R |  | ら | り | る | れ | ろ |
| Wa, Wo, N |  | わ | を | ん | -- | -- |
| G | (VOICED "K") | か゛ | き゛ | く゛ | け゛ | ご |
| Z | (VOICED "S") | さ゛ | し゛ | ず | せ゛ | ぞ゛ |
| D | (VOICED "T") | だ゛ | ち゛ | つ゛ | て゛ | と゛ |
| B | (VOICED "H") | ば゛ | ひ゛ | ふ゛ | へ゛ | ほ゛ |
| P | (ASPIRATED "H") | は゜ | ひ゜ | ふ゜ | ぺ | ほ゜ |

TABLE 3

FIG. 5

|   |   | A | I | U | E | O |
|---|---|---|---|---|---|---|
| A |   | ア | イ | ウ | エ | オ |
| K |   | カ | キ | ク | ケ | コ |
| S |   | サ | シ | ス | セ | ソ |
| T |   | タ | チ | ツ | テ | ト |
| N |   | ナ | ニ | ヌ | ネ | ノ |
| H |   | ハ | ヒ | フ | ヘ | ホ |
| M |   | マ | ミ | ム | メ | モ |
| Y |   | ヤ | -- | ユ | -- | ヨ |
| R |   | ラ | リ | ル | レ | ロ |
| Wa, Wo, N |   | ワ | ヲ | ン | -- | -- |
| G | (VOICED "K") | カ゛ | キ゛ | ク゛ | ケ゛ | コ゛ |
| Z | (VOICED "S") | サ゛ | シ゛ | ス゛ | セ゛ | ソ゛ |
| D | (VOICED "T") | タ゛ | チ゛ | ツ゛ | テ゛ | ト゛ |
| B | (VOICED "H") | ハ゛ | ヒ゛ | フ゛ | ヘ゛ | ホ゛ |
| P | (ASPIRATED "H") | ハ゜ | ヒ゜ | フ゜ | ペ | ホ゜ |

TABLE 4

FIG. 6

JAPANESE TEXT INPUT METHOD USING A LIMITED ROMAN CHARACTER SET

CROSS-REFERENCES TO RELATED APPLICATIONS

The present application is related to the following U.S. Patent application:

U.S. Patent application entitled, "Web Browser Allowing Navigation Between Hypertext Objects Using Remote Control," having application Ser. No. 08/660,088, and filed on Jun. 3, 1996; which is assigned to the assignee of the present invention.

FIELD OF THE INVENTION

The present invention relates generally to the field of electronic text entry, and more particularly to a method of entering Japanese characters into an electronic device.

BACKGROUND OF THE INVENTION

The ability to enter Japanese text into an English-language document or computer application is useful in certain applications and international correspondence. However, the complexity of the Japanese written language poses several challenges for efficient text entry in non-Japanese computers or other electronic devices.

The Japanese written language contains three separate character sets. Simple Japanese characters representing phonetic syllables are represented by the hiragana and katakana character sets. Hiragana characters, which are characterized by a cursive style, are typically used for words native to Japan. Katakana characters, which are characterized by a more angular style, are typically used for words borrowed from other cultures, or for emphasis and sound effects. The third character set in Japanese is kanji. Kanji are the complex Japanese characters borrowed from the Chinese language. There are over 9000 kanji characters in the Japanese language. Approximately 4000 kanji are used on a semi-regular basis, while knowledge of 2000 kanji is generally required to read a newspaper or get around in Japan. One additional representation of written Japanese is the roman character or "romaji" character set. Romaji are romanized representations of Japanese words based on the sound of a character, and are typically used only to facilitate electronic input of Japanese characters in a computer, or to aid foreign students in the study of Japanese.

Common methods of Japanese text entry for computers and like devices typically require the use of dedicated Japanese character keyboards or standard U.S. "QWERTY" keyboards which have been adapted for Japanese use. Both approaches, however, are quite cumbersome and inefficient. One disadvantage of the Japanese character keyboard is the high number of keys required to represent the basic Japanese character set. A typical Japanese keyboard may have upwards of 100 keys depending on how the various character variations are represented. A disadvantage of the adapted U.S. QWERTY keyboard approach is that often complex keystroke combinations must be mastered in order to generate the proper Japanese character, since an alphabetical arrangement of roman letters is not a natural order for entering Japanese text. A second disadvantage of this method is that the standard QWERTY keyboard contains many alphabetic keys which are not used in the Japanese character system. This is due to the fact that Japanese is not normally written with roman characters and can be represented in romaji through only a subset of the 26 roman letters.

Many electronic devices are making increased use of on-screen or "virtual" keyboards to facilitate text entry. This is especially true with devices such as Personal Digital Assistants (PDA's), or computer or communications devices which feature minimal keyboards or keypads for text entry. On-screen keyboards are also used in computer-based communications systems in which a standard computer monitor and keyboard are not utilized. Examples of such systems include the Network Computer (NC) and similar dedicated network server systems. An on-screen keyboard is a picture of a keyboard with each key represented as a separate selectable graphic object. A cursor control device, such as an arrow button or similar directional control, is used to move a cursor or similar on-screen indicator to select a particular character. In a typical text entry situation, the cursor is moved to a desired key with the direction controls, and that key is selected or 'entered' using a separate button on the device. This process is then repeated for each letter in the word.

Existing systems which use on-screen keyboards to enter Japanese text are typically based on either a full roman QWERTY arrangement or a full Japanese character arrangement. However, because of display and text entry constraints of on-screen keyboards, the problems posed by regular keyboards with respect to Japanese text entry are increased in the case of on-screen keyboards. For example, the implementation of a standard Japanese on-screen keyboard would likely produce a crowded display of characters that would be difficult to distinguish in a low-resolution or limited screen area. Likewise, the use of a standard U.S. QWERTY on-screen keyboard for Japanese text entry would likely require a complex input routine involving many keystrokes to move among common romaji characters since a standard QWERTY layout is an inherently inefficient arrangement for romaji.

It is therefore desirable to provide a system which allows the entry of Japanese text into an electronic device with minimum required user input, thereby speeding entry of the text and reducing the display area occupied by the keyboard.

SUMMARY OF THE INVENTION

The present invention discloses a method and apparatus for entering Japanese characters into an electronic device using a keyboard containing certain roman vowel and consonant characters arranged in a specific arrangement of rows. The keyboard facilitates the entry of Japanese in romaji form for conversion to corresponding Japanese characters by a processing unit.

According to one aspect of the present invention, the keyboard is displayed as an on-screen keyboard on a display device with the keys selected by an infra-red coupled remote control unit. The on-screen keyboard contains a horizontally arranged row of roman vowel characters between two horizontally arranged rows of roman consonant characters, with a fourth row of additional characters. The consonant characters on the keyboard are a limited selection of the full roman consonant character set. A romaji version of a Japanese character is generated by selecting a vowel or a combination of a consonant and vowel or optional character using directional buttons on the remote control unit. The keyboard character keys are arranged such that the distance between the consonants and vowels for combinations used in most Japanese characters is minimized. An input utility automatically converts a valid romaji input into a Japanese kana equivalent. The Japanese kana characters can then be converted to corresponding kanji characters through a conversion utility.

Other features of the present invention will be apparent from the accompanying drawings and from the detailed description which follows.

BRIEF DESCRIPTION OF THE DRAWINGS

The present invention is illustrated by way of example, and not by way of limitation, in the figures of the accompanying drawings and in which like reference numerals indicate similar elements and in which:

FIG. 1 illustrates the basic Japanese sounds represented by Japanese written characters.

FIG. 2 illustrates additional Japanese sounds represented by Japanese written characters.

FIG. 5 illustrates the Japanese hiragana characters corresponding to the Japanese voiced sounds.

FIG. 6 illustrates the Japanese katakana characters corresponding to the Japanese voiced sounds.

DETAILED DESCRIPTION

Figure 3:
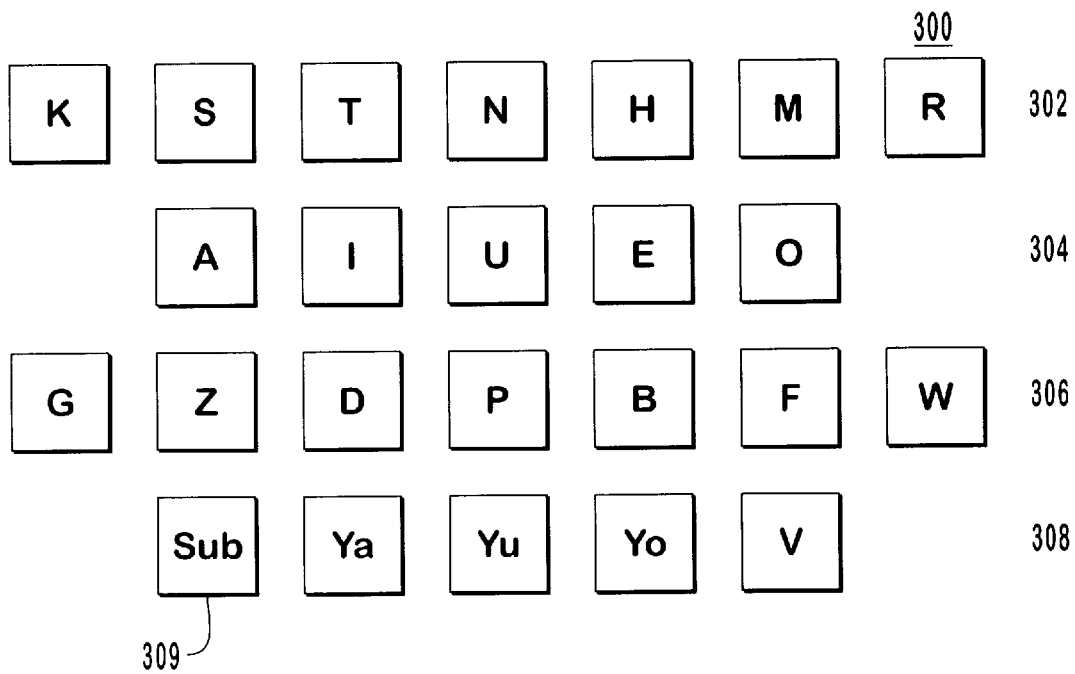
FIG. 3 illustrates an arrangement of a limited roman character set for use in a compact roman character keyboard for Japanese text entry according to one embodiment of the present invention.

Japanese is written with kanji (characters of Chinese origin) and two sets of phonetic symbols, hiragana and katakana (together referred to as kana). A single kanji character may contain one symbol or several symbols, and may, by itself, represent an entire word or object. Unlike kanji, kana have no intrinsic meaning unless combined with other kana or kanji to form words. Both hiragana and katakana contain 46 symbols each. Combinations and variations of the kana characters provides the basis for all of the phonetic sounds present in the Japanese language. These sounds can be also be represented with roman characters using a standard transliteration method. A widely accepted romanization standard is the Hepburn system, and the roman representation of corresponding Japanese sounds is referred to as "romaji".

The basic Japanese sounds represented in romaji are illustrated in Table 1 of FIG. 1. As can be seen in Table 1, the syllables comprising the Japanese sounds are based on the vowel group A, I, U, E, and O with accompanying consonants, such as K, G, S, Z, and so on. In modern Japanese usage, certain sounds (yi, ye, wi, wu, and we) are rarely used, but are included for the sake of completeness.

Japanese also contains a limited number of diphthongs which are formed by appending subscript versions of YA, YI or YU to certain base sounds to create the combined sounds. These diphthongs are listed in Table 2 of FIG. 2. As can be seen in Table 2, the combination of Ki+Ya forms Kya, Shi+Yu forms Shu, and so on. In the written representation, the Ya, Yu, or Yo are written or typed as subscripts following the base character. Other combinations are used for some Japanese words with foreign origins, such as Pi+Yu (used "KONPYUTA") and Fu+A (used in "FAMIRI"), and U (voiced) +I (used in "VIINASU"). In these examples the Yu, A and I are written as subscripts following the initial character.

On most computer systems that allow entry of Japanese in roman character form, a normal QWERTY keyboard is used. However, the standard romaji representation of Japanese does not require the use of all 26 letters of the roman alphabet. As can be seen from the tables in FIGS. 1 and 2, characters such as Q and X are not used. The minimum subset of roman characters needed to adequately represent Japanese is listed in Table 3 below.

TABLE 3

| A | I | U | E | O | K | S | T | N | H |
|---|---|---|---|---|---|---|---|---|---|
| M | R | G | Z | D | P | B | F | W | Y |

As shown in Table 3, only 20 roman characters is necessary to form all of the sounds available in Japanese. This subset of roman characters forms the basis of the Japanese entry keyboard according to one embodiment of the present invention (hereinafter referred to as the "compact Romaji keyboard"). The compact Romaji keyboard features a reduced number of keys, thus making it easier to find a desired key, since keys for unused letters are not present. The compact Romaji keyboard further features a superior keyboard layout for the entry of romanized Japanese characters over the standard QWERTY keyboard layout.

FIG. 3 illustrates the arrangement of the roman keys of the compact Romaji keyboard according to one embodiment of the present invention. The characters of the compact Romaji keyboard are arranged in four rows. The first row 302 includes the characters K, S, T, N, H, M, and R; the second row 304 includes the vowels A, I, U, E, and O; and the third row 306 includes the characters G, Z, D, P, B, F, and W. The fourth row 308 includes the characters Ya, Yu Yo, and V. The Ya, Yu, and Yo characters are used to form the diphthong sounds illustrated in FIG. 2. The fourth row 308 also contains a subscript key 309. Subscript key 309 is used to cause the next selected character to be a subscript variation, and is commonly used with the Ya, Yu, Yo characters to represent the diphthong combinations.

According to the arrangement of the characters 300 in FIG. 3, roman characters which are never used in common romaji conventions (such as X, Q, and L), or which have only exceptional uses (such as C and J) are not present. In character arrangement 300, the consonants are arranged in the natural order for Japanese, as opposed to a standard alphabetical order or QWERTY layout. This facilitates character entry for those familiar with typical Japanese character construction. Moreover, the keys are arranged around the center 5 vowels which are part of all Japanese syllables and are shown in the natural order for Japanese. Since Japanese kana syllables are normally constructed in romaji as a roman consonant and vowel combination, a vowel is almost always used between two consonants. The arrangement of the letters in FIG. 3 thus illustrates an optimal layout for romaji input based on the order of the letters and the placement of a row of vowels between two rows of consonants. This arrangement of the vowels in the center row allows a minimum number of user interactions to construct a romanized Japanese syllable.

In order to input a Japanese character or word using the compact Romaji keyboard utilizing the roman character arrangement of FIG. 3, the user simply selects the roman characters comprising the Japanese character or word. For example to input the Japanese character 'ka', the user would select 'K' then 'A'. The processing system coupled to the keyboard could contain a an input utility, or front-end processor, which automatically translates the roman character input into a Japanese character to be displayed on a display device. Such a processing system according to one embodiment of the present invention will be discussed in further detail below.

In order to enter a full word, the user would simply enter the letters for the characters comprising the word. For example, to enter the Japanese word 'sakura', the user would simply enter the letters S-A-K-U-R-A in sequence. Through an input utility, the processing system can be configured to automatically convert a romanized entry into a corresponding Japanese character upon the entry of a valid romaji consonant-vowel combination. Therefore, if the user inputs the word SAKURA, the processor would automatically convert S-A to its kana equivalent upon the entry of S and A; the processor would next convert K-U to its kana equivalent upon the entry of K and U; the processor would then convert R-A to its kana equivalent upon the entry of R and A, thus resulting in sakura displayed in either hiragana or katakana. Alternatively, the processing system could be configured to display the input text as romaji, and then convert the romaji text to kana upon a subsequent operation. Such a system would facilitate the conversion of selected portions of input text.

In order to enter words formed by subscripting certain characters, (i.e., words formed by sounds in Table 2), the subscript character (sub) 309 is used. For example, to enter the word 'Tokyo', the user would enter T-O-U-K-sub-Yo-U. This would result in the kana for Tokyo. Besides the Ya, Yu, Yo characters illustrated in FIG. 2, another commonly subscripted character is the character for "tsu". When used in conjunction with a vowel (A, I, U, E, O), a subscripted TSU indicates that the preceding syllable is to be pronounced in a clipped or emphasized manner. Thus in order to input the word 'Roppongi', the user would enter R-O-sub-T-U-P-O-N-G-I. According to an alternative embodiment of the present invention, the subscripted character TSU can entered by repeating two consonants that create the sound represented by the character, namely TT, SS, and PP, instead of through the use of the subscript key 309.

Entering any of the characters illustrated in keyboard arrangement 300, in appropriate combinations allows the user to enter romaji characters corresponding to each of the sounds illustrated in FIGS. 1 and 2. FIG. 5 illustrates the base hiragana character set corresponding to the Japanese sounds represented in FIG. 1, and FIG. 6 illustrates the base katakana character set corresponding to the Japanese sounds represented in FIG. 1. As mentioned above, the kana characters for the diphthong sounds of FIG. 2 are displayed as a base character followed by a subscripted Ya, Yu, or Yo character.

Figure 4:
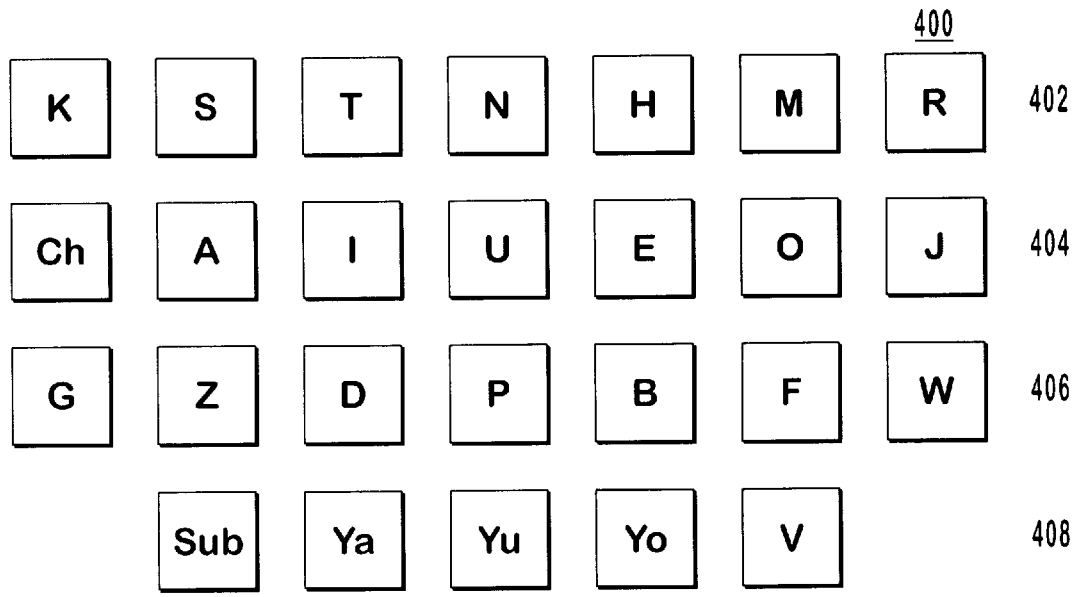
FIG. 4 illustrates an alternative arrangement of a limited roman character set for use in a compact roman character keyboard for Japanese text entry according to an alternative embodiment of the present invention.

It should be noted that with the compact Romaji keyboard of FIG. 3, some modifications must be made to the usual romanization conventions. Specifically:

TI instead of the more common CHI
T(subscript)Ya instead of the more common CHA
T(subscript)Yo instead of the more common CHO
T(subscript)Yu instead of the more common CHU
ZI instead of the more common JI
Z(subscript)Ya instead of the more common JA
Z(subscript)Yo instead of the more common JO
Z(subscript)Yu instead of the more common JU
I(subscript)E instead of YE
SI instead of SHI,
TU instead of TSU FIG. 4 illustrates the layout of the compact Romaji keyboard according to an alternate embodiment of the present invention. In the keyboard arrangement illustrated in FIG. 4, a key for the characters Ch and J are added. This allows the direct input of these characters for romanization systems which use these characters. The keys of the compact Romaji keyboard of FIG. 4 are again laid out in four basic rows. The first row 402 includes keys for the characters K, S, T, N, H, M, and R; the second row 404 includes keys for the vowels A, I, U, E, and O, and the extra characters Ch, and J; and the third row 406, includes keys for the characters G, Z, D, P, B, F, and W. The fourth row 408, includes keys for the characters Ya, Yu Yo, and V, as well as the subscript key.

It should be noted that other keyboard layouts are possible, as is the addition or deletion of certain non-critical characters. For example, in the keyboard arrangement illustrated in FIG. 3, the V could be eliminated since the voiced V sound is missing from Japanese and very few foreign-borrowed Japanese words use a voiced V sound. In these cases, substituting the character B for V is usually adequate. Likewise, several other Japanese romanization conventions besides the standard Hepburn system may be encountered. For instance Japanese does not have a sound which corresponds to the English L sound. However, because the Japanese R is pronounced hard, it often sounds like L when spoken. Therefore, in some conventions, L may be used instead of R. In these cases, the key selection and layout of the compact Romaji keyboard may be modified accordingly.

With the compact Romaji keyboard, the user has much less information on the screen from which to select the keys required to enter a Japanese word. The compact layout also requires fewer user interactions to enter typical Japanese words as compared to a normal QWERTY or Japanese character keyboard. The arrangement of the keys greatly facilitates romaji character input in a way that reduces the number of adjacent key movements. The layout of four rows with the vowel row positioned between the two consonant rows ensures that in order to select a consonant/vowel combination, the cursor need only be moved one or two rows up or down. This greatly decreases in the number of key entries required to input a character, thus reducing the time and effort required to input Japanese text on a virtual keyboard. Furthermore, the order of the consonants and vowels is similar to the order in which kana characters are taught in Japanese schools, unlike the arbitrary layout of the QWERTY keyboard.

WebTV System

The present invention is included in a system known as WebTV™, which uses a standard television set as a display device for browsing the web and which connects to a conventional network, such as the Internet, using standard telephone, Integrated Services Digital Network (ISDN), or similar communication lines (WebTV™ is a trademark of WebTV Networks, Inc. of Palo Alto, Calif.). In accordance with the present invention, a user of a WebTV™ client system can utilize WebTV™ network services provided by one or more remote WebTV™ servers. The WebTV™ network services can be used in conjunction with software running in a WebTV™ client system to browse the web, send electronic mail, and to make use of the Internet in various other ways.

In one embodiment, the steps of the present invention are embodied in machine-executable instructions. The instructions can be used to cause a general-purpose or special-purpose processor which is programmed with the instructions to perform the steps of the present invention. Alternatively, the steps of the present invention may be performed by specific hardware components that contain hardwired logic for performing the steps, or by any combination of programmed computer components and custom hardware components.

Figure 7:
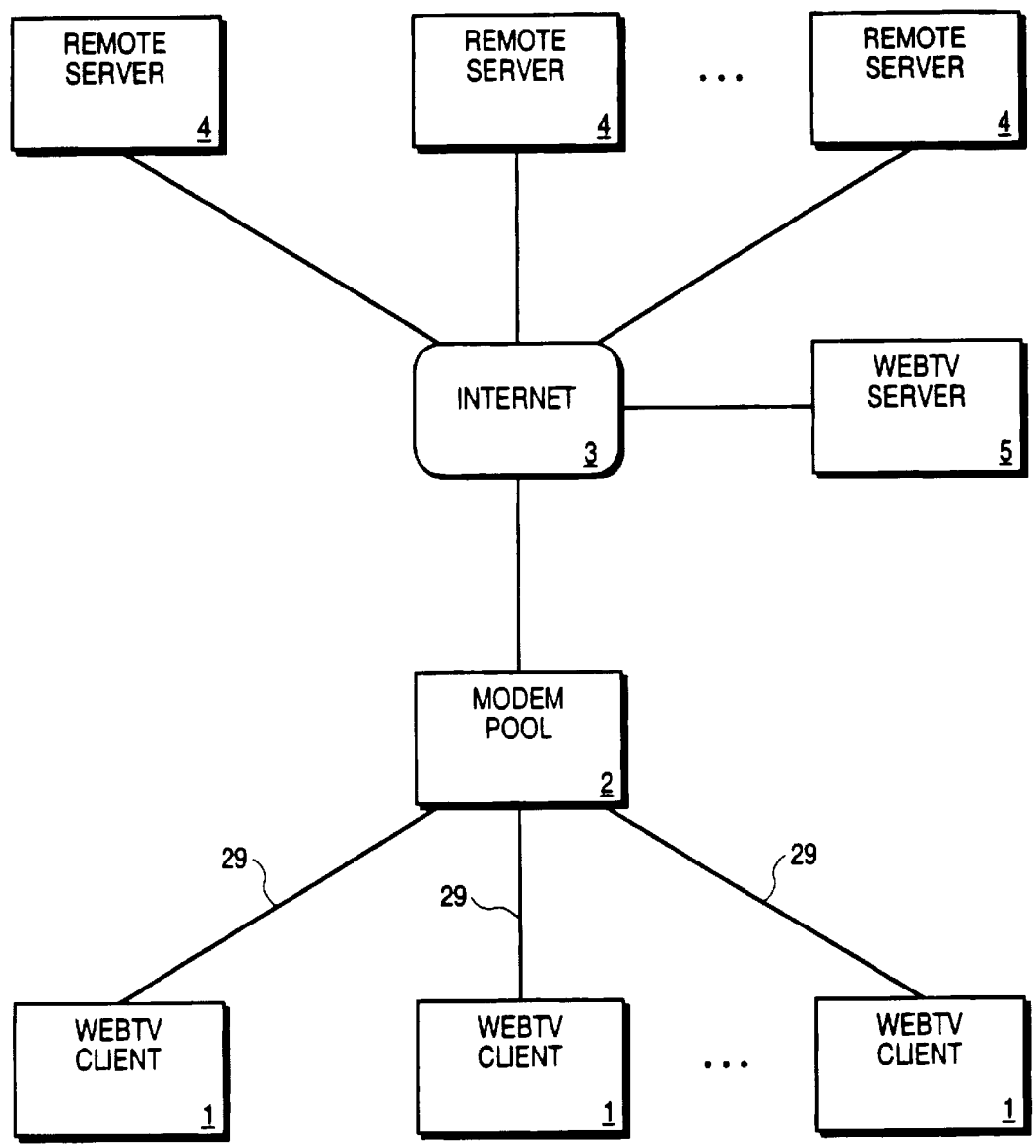
FIG. 7 illustrates several client systems connected to a server system for utilization of Japanese character input.

FIG. 7 illustrates a basic configuration of the WebTV™ network according to one embodiment. A number of WebTV™ clients 1 are coupled to a modem pool 2 via direct-dial, bidirectional data connections 29, which may be telephone, ISDN, or any other similar type of connection. The modem pool 2 is coupled typically through a router to a number of remote servers 4 via a conventional network infrastructure 3, such as the Internet. The WebTV™ system also includes a WebTV™ server 5, which specifically supports the WebTV™ clients 1. The WebTV™ clients 1 each have a connection to the WebTV™ server 5 either directly or through the modem pool 2 and the Internet 3. Note that the modem pool 2 is a conventional modem pool, such as those commonly providing access to the Internet and private networks.

Client System Architecture

Figure 8:
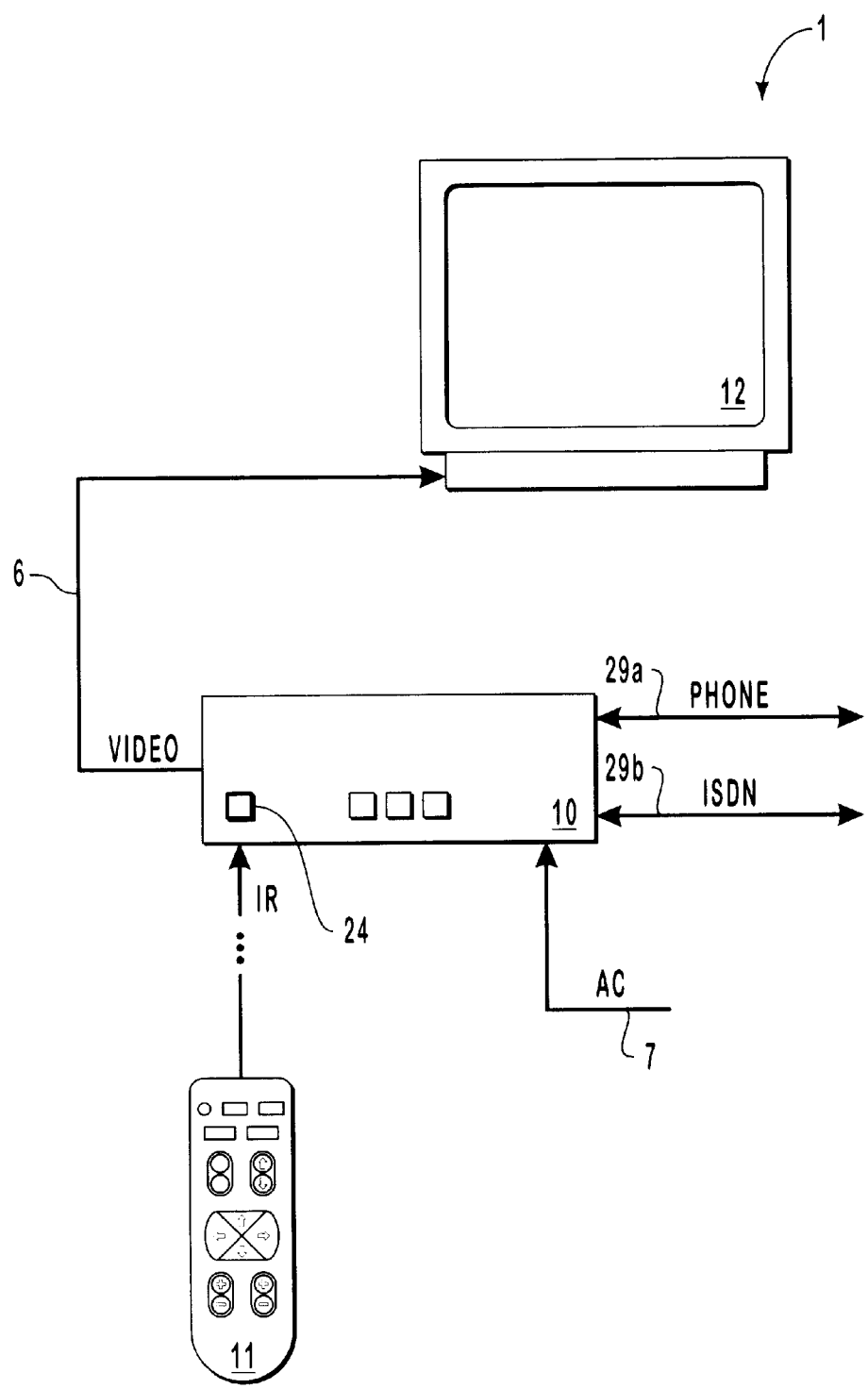
FIG. 8 is a block diagram of a client system of FIG. 7.

FIG. 8 illustrates a WebTV™ client 1. The WebTV™ client 1 includes an electronics unit 10 (hereinafter referred to as "the WebTV™ box 10"), an ordinary television set 12, and a remote control 11. In an alternative embodiment of the present invention, the WebTV™ box 10 is built into the television set 12 as an integral unit. The WebTV™ box 10 includes hardware and software for providing the user with a graphical user interface, by which the user can access the WebTV™ network services, browse the web, send e-mail, and otherwise access the Internet.

The WebTV™ client 1 uses the television set 12 as a display device. The WebTV™ box 10 is coupled to the television set 12 by a video link 6. The video link 6 is an RF, S-video, composite video, or other equivalent form of video link. The communication link 29 between the WebTV™ box 10 and the server 5 is either a telephone connection 29a or an ISDN connection 29b. The WebTV™ box 10 receives AC (alternating current) power through an AC power line 7.

Remote control 11 is operated by the user in order to control the WebTV™ client 1 in browsing the web, sending e-mail, and performing other Internet related functions. The WebTV™ box 10 receives commands from remote control 11 via an infrared (IR) communication link. In alternative embodiments, the link between the remote control 11 and the WebTV™ box 10 may be RF or any equivalent mode of transmission, and remote control 11 may be configured to control television set 12 through a link.

The WebTV™ box 10 includes application software which, when executed by a processor in the box 10, provides the user with a graphical user interface by which the user can access the WebTV™ network services and browse the web. The application software is automatically executed upon application of power to the WebTV™ box 10.

Figure 9:
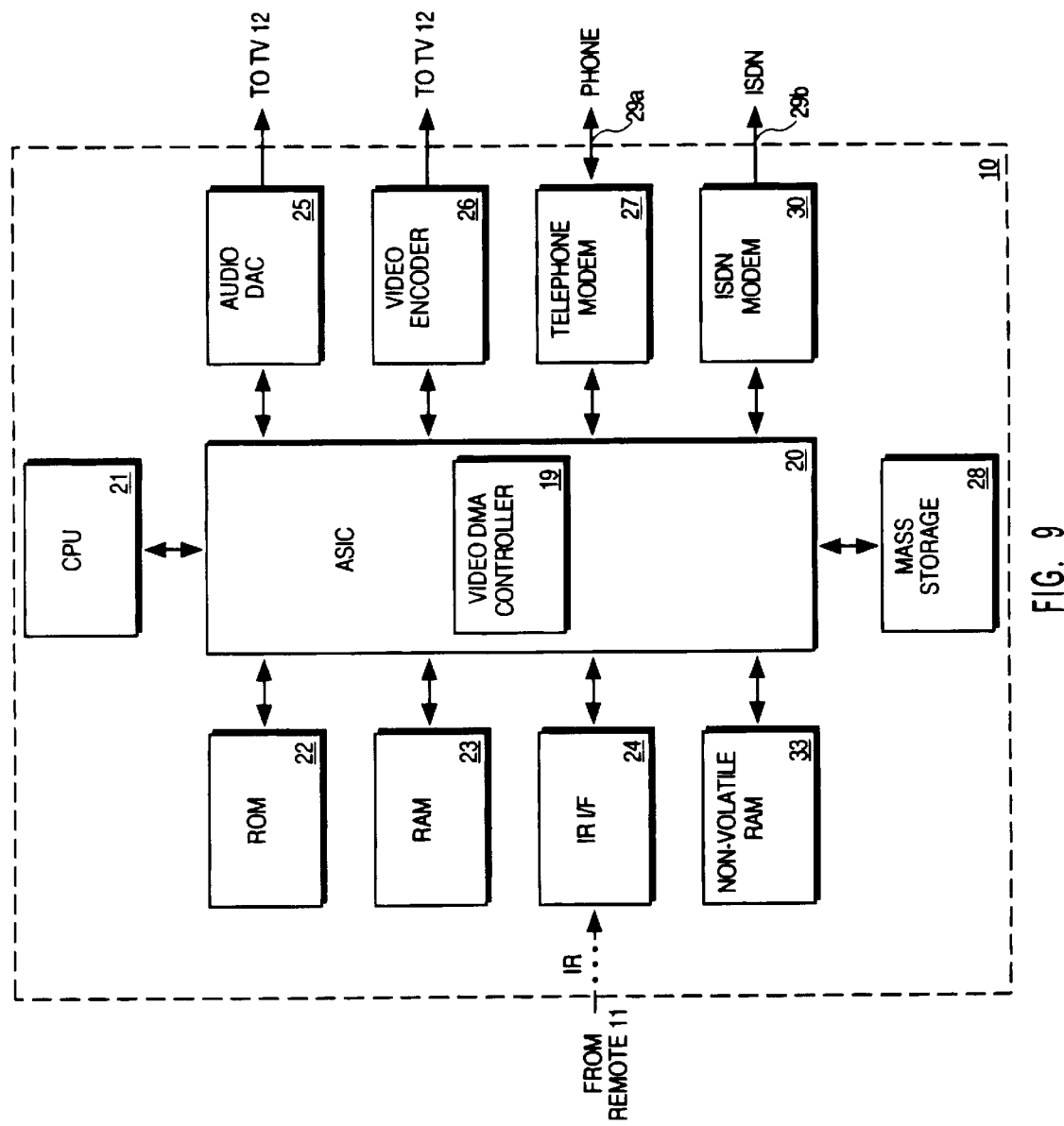
FIG. 9 is a block diagram of an electronics unit used to implement a web browser on the client system of FIG. 8 according to one embodiment of the present invention.

FIG. 9 is a block diagram of the internal features of the WebTV™ box 10. Operation of the WebTV™ client 1 is controlled by a central processing unit (CPU) 21 which is coupled to an Application-Specific Integrated Circuit (ASIC) 20. The CPU 21 executes software designed to implement features of the present invention. ASIC 20 contains circuitry which may be used to implement certain features provided by the WebTV™ client 1. ASIC 20 is coupled to an audio digital-to-analog converter 25 which provides audio output to television 12. In addition, ASIC 20 is coupled to a video encoder 26 which provides video output to television set 12. An IR interface 24 detects IR signals transmitted by remote control 11 and, in response, provides corresponding electrical signals to ASIC 20. A standard telephone modem 27 and an ISDN modem 30 are coupled to ASIC 20 to provide connections 29a and 29b, respectively, to the modem pool 2 and, via the Internet 3, to the remote servers 4. Note that the WebTV™ box 10 also may include a cable television modem (not shown).

Also coupled to ASIC 20 is Read-Only Memory (ROM) 22, which provides storage of program code for implementing the application software to be executed by the WebTV™ box 10. Note that ROM 22 may be a programmable ROM (PROM) or any form of erasable PROM (EPROM) or Flash memory. Also coupled to ASIC 20 is Random Access Memory (RAM) 23. A mass storage device 28 may optionally be provided and coupled to ASIC 20. The mass storage device 28 may be used to input software or data to the client or to download software or data received over network connection 29. The mass storage device 28 includes any suitable medium for storing machine-executable instructions, such as magnetic disks, optical disks, and the like. ASIC 20 contains a video DMA (direct memory access) controller 19 which transfers pixel information comprising the displayable images from memory to video encoder 26 for display on television 12.

Application Software

Figure 10:
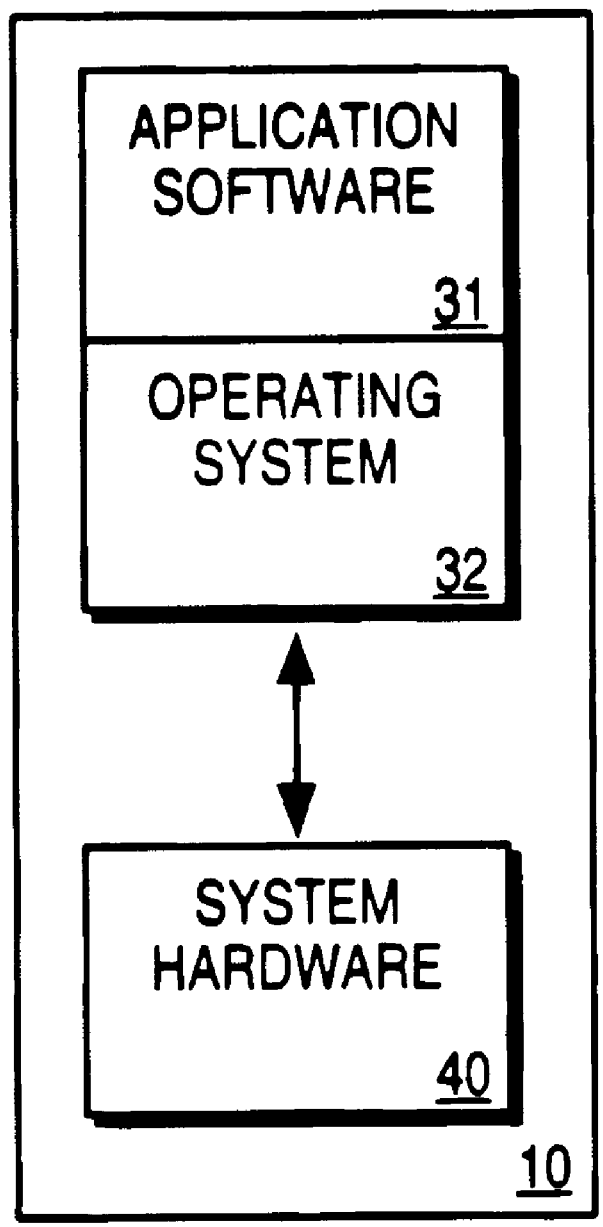
FIG. 10 is a block diagram of web browser application software according to one embodiment of the present invention.

As mentioned above, the WebTV™ box 10 includes application software including a web browser. Referring now to FIG. 10, the above-mentioned application software 31 operates in conjunction with operating system (OS) software 32. The OS software 32 includes various device drivers and otherwise provides an interface between the application software 31 and the system hardware components 40 (i.e., the elements illustrated in FIG. 9).

In the preferred embodiment, the application software 31 and OS software 32 are stored in ROM 22. It will be recognized, however, that either or both of application software 31 and OS software 32 can be stored on any suitable storage medium, including magnetic or optical storage devices.

Figure 11:
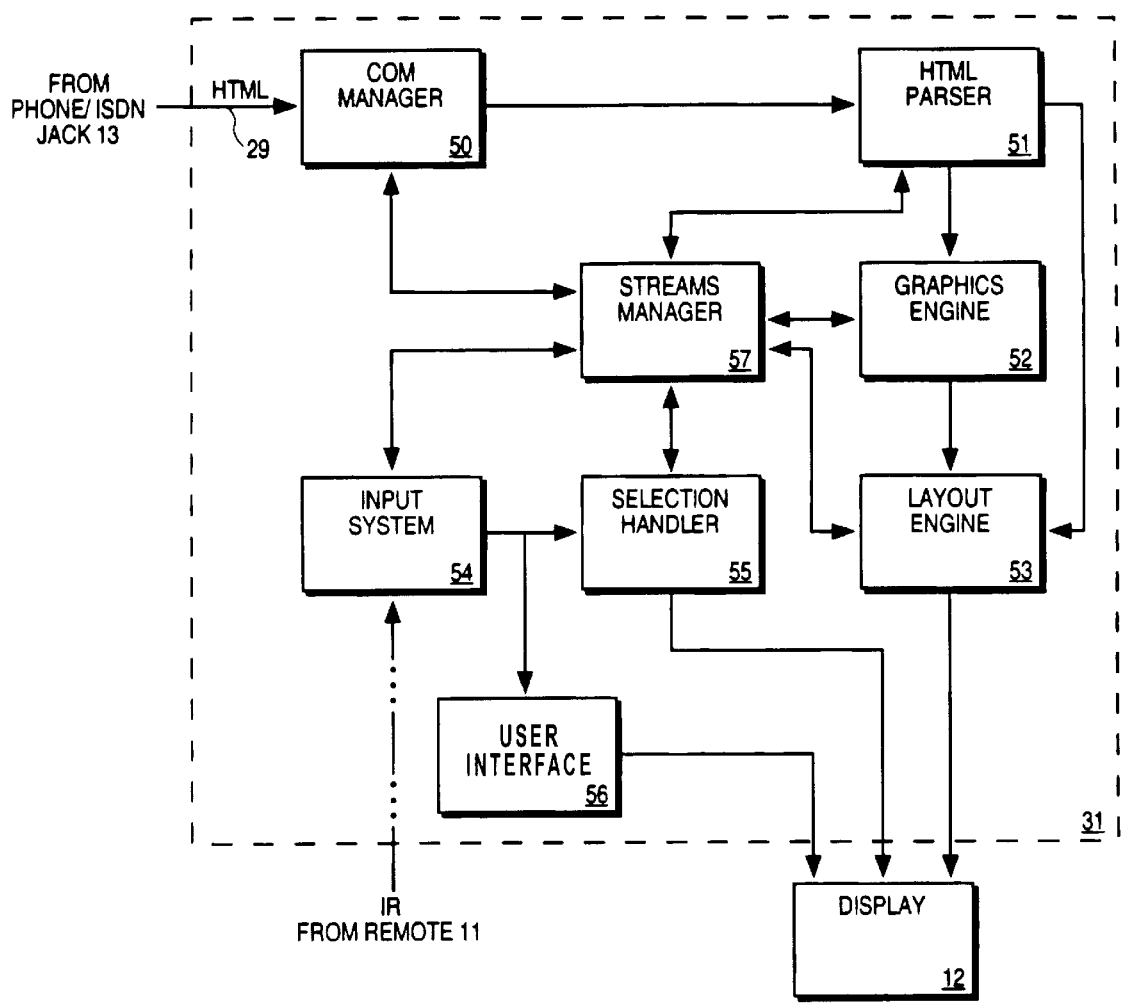
FIG. 11 illustrates the functional relationship between hardware and software in the client processing system of FIG. 9.

The Japanese text input functions of the present invention are implemented by application software 31. FIG. 11 illustrates the functional relationships between the various components of application software 31. Application software 31 includes a communications manager 50, an HTML (Hypertext Mark-up Language) parser 51, a graphics engine 52, a layout engine 53, an input system 54, a user interface 56, a selection handler 55, and a streams manager 57. The client system receives web pages over network connection 29 in the form of HTML documents. Streams manager 57 controls and coordinates movement of data throughout the system.

Each HTML document is initially input to communications manager 50. Communications manager 50 performs functions necessary to receive an HTML document over network connection 29, including handling high-level communications protocols, such as HTTP (Hypertext Transport Protocol), TCP/IP (Transmission Control Protocol/Internet Protocol), among others. A received HTML document is provided by communications manager 50 to HTML parser 51. HTML parser 51 converts HTML page descriptions to a displayable format for the display 12 on a client system. Image information, such as JPEG or GIF image information, are provided by HTML parser 51 to layout engine 53 via a graphics engine 52, which is responsible for measuring and drawing images.

In the course of browsing through a displayed graphic or web page, the user activates buttons on remote control 11, which transmit IR signals to WebTV™ box 10. Input system 54 records these inputs and provides them to selection handler 55 and user interface 56. Remote control 11 provides cursor control buttons (up, down, left, and right) which control the positioning of a cursor or other objects on the display. Input system 54 can also handle input queuing and processing of inputs from various other input devices, such as a keyboard coupled to WebTV™ box 10 through either a standard hardwire link or an IR link. Other aspects of the web browser which are visible to the user are provided by user interface 56 based on signals received from input system 54.

On-Screen Keyboard

Figure 12:
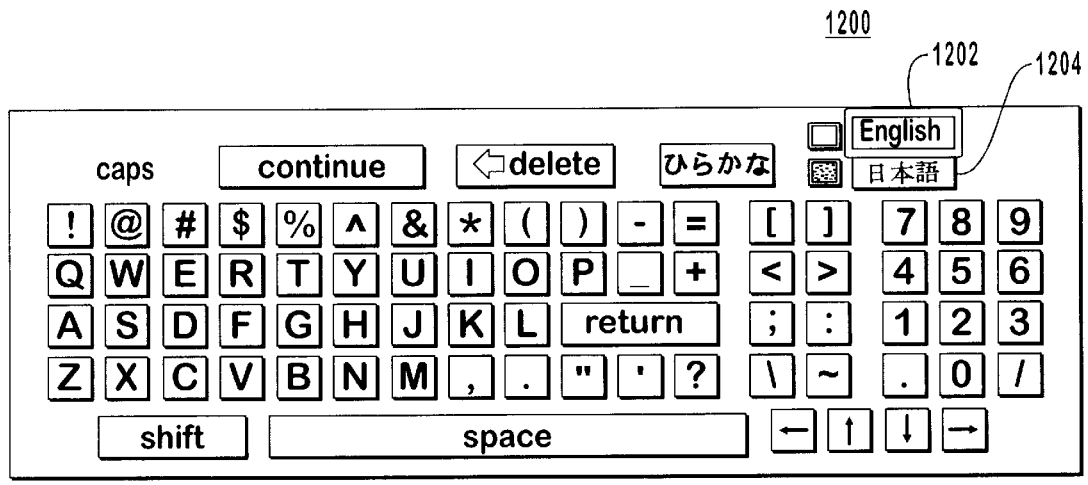
FIG. 12 illustrates an on-screen English language keyboard for a web browser which provides access to a roman character Japanese text keyboard.

In one embodiment of the present invention, the WebTV™ system provides on-screen keyboards which provide for the entry of Japanese characters. FIG. 12 illustrates the English keyboard which is used with the WebTV™ system. English keyboard 1200 is a standard PC-style QWERTY keyboard with the addition of one or more special keys. The English selection key 1202 selects the standard English keyboard 1200. The Japanese selection key 1204 selects the on-screen compact Romaji keyboard illustrated in FIG. 13. It should be noted that the on-screen keyboards embodied within the present invention may either be formatted and transmitted in the form of web pages provided by WebTV™ box 10, or in the form of graphics objects provided locally by the application software.

Figure 13:
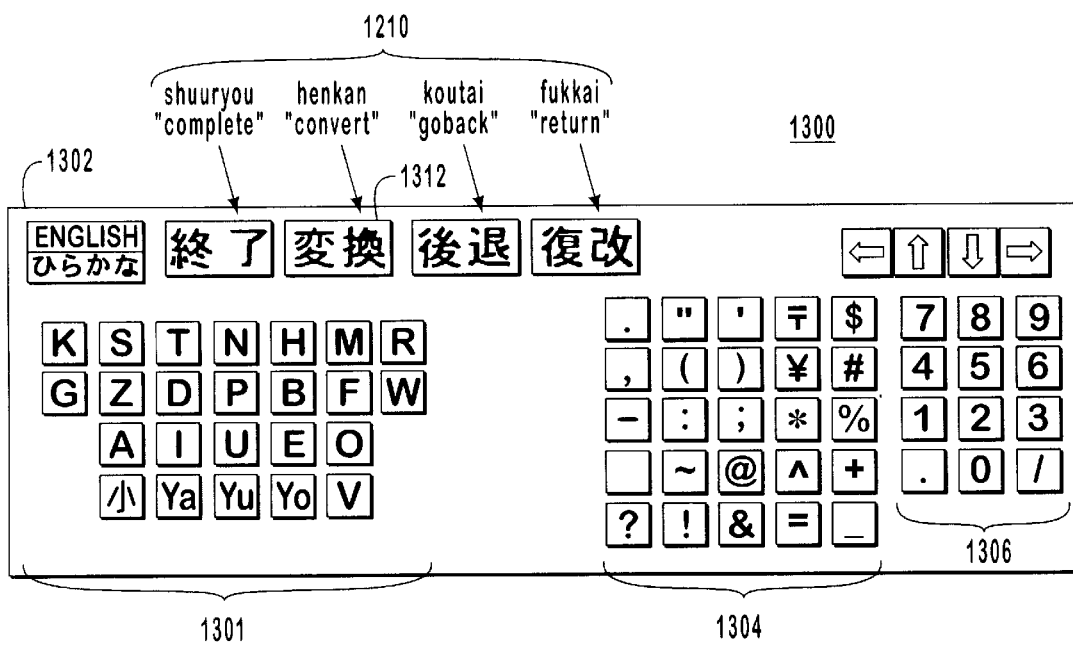
FIG. 13 illustrates a compact roman character keyboard for Japanese text entry according to one embodiment of the present invention.

FIG. 13 illustrates the compact Romaji keyboard according to one embodiment of the present invention. Compact Romaji keyboard 1300 includes several groups of keys. The first group of keys 1301 are the roman character keys for the input of Japanese words or characters in romaji form. Group 1301 corresponds to the keyboard arrangement 300 illustrated in FIG. 3. Compact Romaji keyboard 1300 also includes punctuation keys 1304 which allow for the input of punctuation symbols and special characters which are common in Japanese usage, and a numeric keypad 1306. Keyboard 1300 also includes function keys 1310 displayed along the top of the keyboard. The function key labeled 'henkan' (convert) 1312 allows the conversion of either a katakana or hiragana Japanese word into the kanji equivalent. Selection key 1302, labeled 'ENGLISH', provides access back to the standard English keyboard 1200 illustrated in FIG. 12.

It should be noted that keyboard 1300 may also include additional function keys other than those illustrated, to provide further functionality. For example, Keyboard 1300 may include an input style key (or keys) which select the style of the character displayed by the keyboard. Such a function could cause the characters to be displayed as roman, hiragana, or katakana characters.

On keyboard 1300, a user inputs a Japanese character or word by placing the cursor over the appropriate key using the direction keys provided on remote control unit 11, and moving the cursor among the keys for selection of the appropriate roman character. In one embodiment of the present invention, remote control unit 11 contains four cursor control buttons. A left arrow button moves the cursor left on the keyboard, an up arrow button moves the cursor up on the keyboard, a down arrow button moves the cursor down on the keyboard, and a right arrow button moves the cursor right on the keyboard. The cursor is moved from among the characters by simply pressing the appropriate direction buttons. The desired character is selected to be displayed by depressing an 'ENTER' key on remote control 11. In one embodiment of the present invention, the cursor may only be moved sequentially from one key to an adjacent key on keyboard 1300. For example, if the cursor is on the character K and the user desires to move to the character I, the user would need to depress the right arrow button on remote control 11 twice to move to the character T and then depress the down arrow button on remote control 11 once to move to the character I.

Depending on the implementation of the on-screen keyboard, the cursor may be displayed on a key in the form of a selection box or window, a highlight, reverse graphic, or any similar indication. Similarly a key which has been selected for input may be displayed in a highlighted form to differentiate it from non-selected keys.

It will be appreciated that the arrangement of the keys presented in FIG. 3 and on keyboard 1300 minimizes the number of keystrokes required to input a romaji consonant and vowel combination for common Japanese characters. The fewer number of direction inputs required to move from one letter to the next makes it easier and faster to enter romaji on this keyboard rather than on a standard QWERTY layout. It also requires less keystrokes than a standard Japanese character on-screen keyboard.

In one embodiment of the present invention, the on-screen keyboard of FIG. 13 is provided on a text entry screen which contains a text-entry field which displays Japanese characters as they are entered in romaji. According to one embodiment of the present invention, the entry of a valid romaji combination automatically causes the conversion to the corresponding hiragana or katakana Japanese character depending on which display style is selected. The conversion process may be implemented by a front-end processor stored in the appropriate memory device in WebTV™ box 10 and executed by CPU 21. An unrecognized roman character input would not be converted and would be displayed as roman letters. WebTV™ box 10 could also contain the appropriate kanji conversion program to provide the conversion of the input katakana or hiragana to kanji characters upon selection of the Henkan or convert button 1312.

Although keyboards 1300 and 1200 have been disclosed as on-screen or virtual keyboards, in an alternative embodiment of the present invention these keyboards could also be provided as physical character input devices or hard keyboards. In this case, layout of the keys of the keyboard would be identical to the graphical layout of the keys shown for keyboards 1200 and 1300 in FIGS. 12 and 13, respectively. If provided as hard keyboards, however, the keyboards would interface with WebTV™ box 10 through the appropriate input/output port. Such an input/output port would be coupled to ASIC 20 and CPU 21 illustrated in FIG. 9. Alternatively, hard keyboards for keyboards 1200 and 1300 could be provided in the form of an IR link to port 24 on WebTV™ box 10 just as remote control 11 is coupled through an IR link to WebTV™ box 10.

In a further alternative embodiment of the present invention, the compact Romaji keyboard may be provided in a touch-screen display system in which the keys of the keyboard are selected by touching the keys on a touch sensitive display screen.

Japanese Character Entry Process

Figure 14:
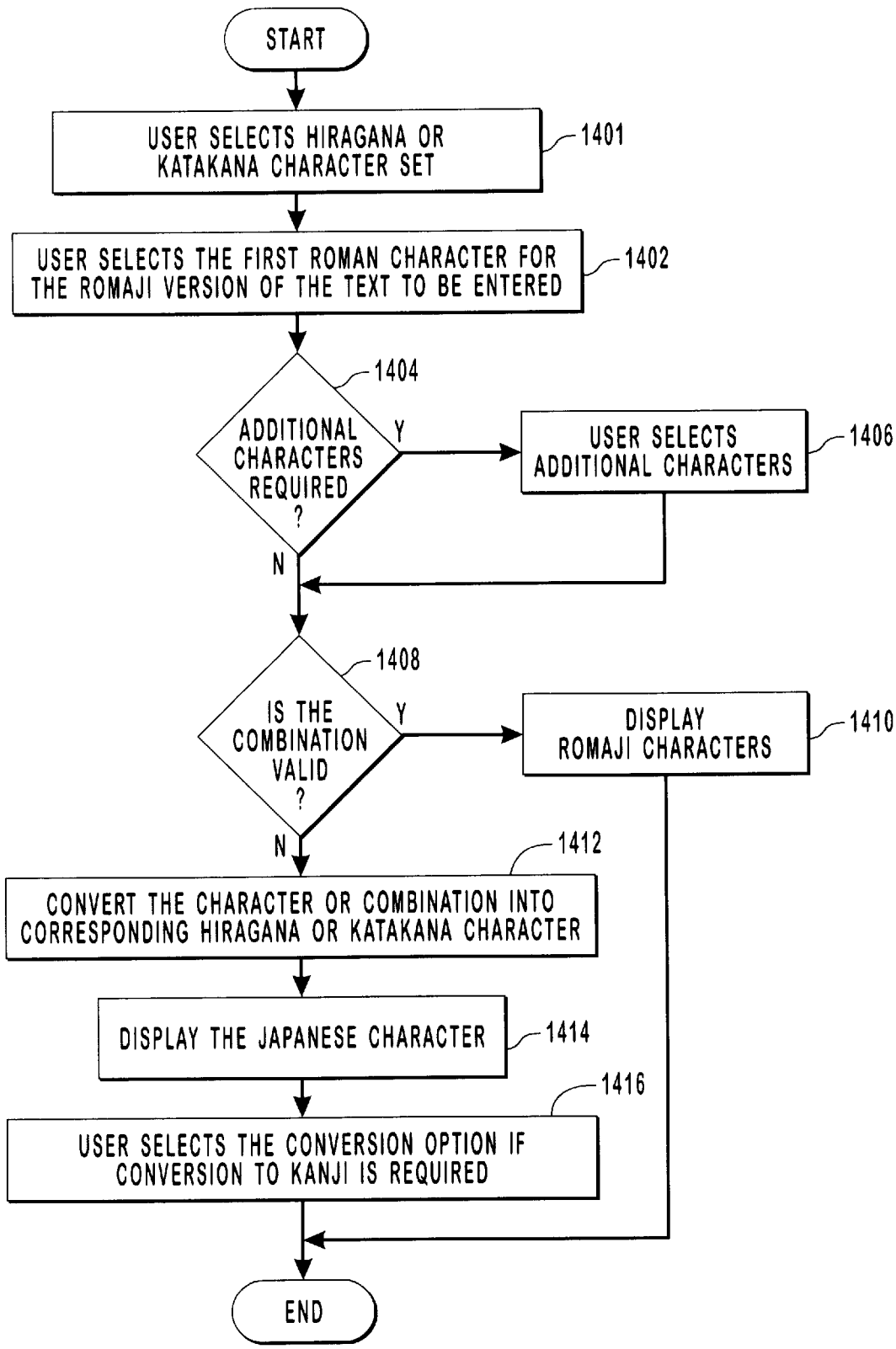
FIG. 14 is a flow chart illustrating the process of entering Japanese text using the roman character Japanese text keyboard according to one embodiment of the present invention.

FIG. 14 is a flow chart which illustrates the process of entering Japanese text through the compact Romaji keyboard according to one embodiment of the present invention. In step 1401 the user selects the type of characters to be displayed. Japanese characters can be displayed as either katakana or hiragana using appropriate option buttons or commands. In step 1402 the user selects the first roman letter of the Japanese character to be displayed. Some Japanese characters consist only of a single romaji character equivalent. For example, the characters corresponding to the vowels A, I, U, E, and O are single kana characters.

In step 1404, the processing system checks to see whether additional characters are required. Most romaji consonants alone will not create or do not correspond to a Japanese character and thus must be combined with a vowel to create a valid Japanese character. If, in step 1404, it is determined that an additional roman letter is required, the user, in step 1406, selects the second roman letter. For example, if the first letter were K, the second letter selected in step 1406 could be A to form the Japanese sound "Ka". If, however, an additional roman letter is not required, it is determined in step 1408 whether the character or the combination selected in step 1406 is a valid Japanese sound combination. If, in step 1408, it is determined that the character or combination of characters is not valid to create a corresponding Japanese character, the processing system displays the input in roman letters, step 1410. However, if the processing system determines that a valid character or combination was entered, the processing system, which contains a front-end conversion processor, converts the romaji character or combination into corresponding Japanese characters. The corresponding Japanese character could be either a katakana character or a hiragana character depending on which option the user selected in step 1412.

In step 1414, the processing system displays the appropriate Japanese character on the display device coupled to the processing system. If conversion to kanji is required, the user may select the conversion button and a conversion processor converts the katakana or hiragana characters into the corresponding kanji, step 1416.

Keyboard Screen Authoring

In one embodiment of the present invention, the WebTV™ web browser screens are created using standard HTML command structures well known to those skilled in the art. Similarly, each of the available on-screen keyboard screens are also produced by constructing HTML objects and program links. Various different page formats and sequences may be utilized to achieve the present invention.

According to another embodiment, the on-screen keyboard screens, including the on-screen compact romaji keyboard screen 1300 could be produced using bit-mapped images or standard graphic format images, and displayed on a display device through a network interface, or over a broadcast signal. In such embodiments these screens need not be web pages accessed from the World-Wide Web using a web browser, but instead could be images of the type normally created, transmitted and displayed within the system in which the display device is typically used, such as a Local Area Network for a computer display, or a broadcast system for a television. In yet another embodiment, the screen setup pages could programmed into the display device as a built-in feature and accessed through a dedicated control button or on-screen menu.

Each of the keys and control buttons in the on-screen compact Romaji keyboard screen, as well as the control and link buttons in other keyboard pages, are graphics objects embedded within their pages through standard HTML object or function calls.

Thus, a method and apparatus have been described for allowing a user to enter Japanese text on an on-screen keyboard with a minimum amount of directional control input. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. An apparatus for entering Japanese text comprising:
   a processor;
   a display device coupled to said processor;
   a cursor control device coupled to said processor;
   a text input device coupled to said processor, said text input device comprising:
   a first row of keys, each key of said first row of keys labeled with a roman letter;
   a second row of keys, each key of said second row of keys labeled with a roman letter; and
   a third row of keys, each key of said third row of keys labeled with a roman letter;
   wherein said first, second, and third rows of keys are arranged such that any consonant key is no more than two keys distant in a vertical or horizontal direction from a vowel key.

2. The apparatus of claim 1 wherein said first and third rows of keys each comprise consonant letters.

3. The apparatus of claim 2 wherein said second row of keys include the vowel keys, A, I, U, E, and O, and said second row of keys is placed in between said first row of keys and said third row of keys.

4. The apparatus of claim 3 further including a fourth row of keys, said fourth row of keys including keys to create the Japanese Ya, Yu, and Yo kana characters, and further including a key to display a selected character as a subscripted character.

5. The apparatus of claim 1 wherein selecting a consonant key followed by a vowel key creates a combined consonant-vowel syllable, and wherein said selecting of said combined consonant-vowel syllable causes said processor to convert said combined consonant-vowel syllable into a corresponding Japanese character, said Japanese character displayed on said display device.

6. The apparatus of claim 5 wherein said Japanese character is a hiragana character.

7. The apparatus of claim 5 wherein said Japanese character is a katakana character.

8. The apparatus of claim 5 wherein said text input device comprises an on-screen keyboard displayed on said display device, and said cursor control device is used to select said combined consonant-vowel syllable.

9. The apparatus of claim 8 wherein said cursor control device is a remote control device remotely coupled to said processor, said remote control device containing direction keys for the control of said cursor on said on-screen keyboard.

10. The apparatus of claim 8 wherein said on-screen keyboard comprises a screen image displayed through an interactive display environment including World-Wide Web content.

11. The apparatus of claim 10, wherein said on-screen keyboard is a Hypertext Mark-up Language (HTML) object.

12. The apparatus of claim 11, wherein said display device is a television.

13. The apparatus of claim 8 wherein said on-screen keyboard comprises a graphic image stored in a memory coupled to said processor.

14. The apparatus of claim 5, further including a conversion option button selectable by said cursor control device, selection of said conversion option button causing said processor to convert said Japanese character from a character in a first Japanese character set into a corresponding character in a second Japanese character set.

15. The apparatus of claim 14, wherein the first Japanese character set comprises a hiragana character set, and wherein the second Japanese character set comprises a kanji character set.

16. The apparatus of claim 14, wherein the first Japanese character set comprises a katakana character set, and wherein the second Japanese character set comprises a kanji character set.

17. A method of displaying Japanese characters on a display device, said display device coupled to a processor, said method comprising the steps of:

providing a text entry device, said text entry device comprising a plurality of roman character keys arranged in one or more rows;

receiving an input signal from said text entry device, said input signal specifying a roman character to be processed by said processor;

converting a roman consonant-vowel combination into a corresponding Japanese character upon receipt of a valid roman consonant-vowel combination; and displaying said Japanese character on said display device, wherein said step of providing a text entry device comprises the step of displaying a text entry screen on said display device, said text entry screen containing an on-screen keyboard, said on-screen keyboard containing said plurality of keys arranged in one or more rows, and wherein a first row of said one or more rows contains a first set of roman character consonants;

a second row of said one or more rows contains a set of roman character vowels; and a third row of said one or more rows contains a second set of roman character consonants.

18. The apparatus of claim 17, further comprising the step of displaying said roman consonant-vowel combination on said display device prior to displaying said Japanese character on said display device.

19. A method according to claim 17, further comprising the step of providing a cursor control device, said cursor control device being a remotely controlled device containing one or more direction keys for the control of said cursor on said on-screen keyboard, and said input signal is produced by selection of one of said one or more direction keys by a user, said input signal causing the movement of a selection window on said on-screen keyboard, said selection window indicating a character which is to be entered into said processor.

20. A method according to claim 19, wherein a key of said plurality of keys is selected by positioning said selection window over said key and activating an input button coupled to said processor.

21. A method according to claim 20 wherein said text entry screen comprises a screen image displayed through an interactive display environment including World-Wide Web content.

22. In a client system in communication with at least one remote server system, an apparatus for displaying Japanese characters on a display device through an interactive display environment including World-Wide Web (WWW) content, the apparatus comprising:

means for displaying a text entry screen on said display device, said text entry screen containing an on-screen keyboard;

means for controlling a cursor on said text entry screen;

means for receiving an input signal from a remote input device;

means for determining based on said input signal a selection of a character on said on-screen keyboard;

means for converting one or more characters selected on said on-screen keyboard to a corresponding Japanese character; and means for displaying said Japanese character on said display device.

23. A client system according to claim 22, wherein said on-screen keyboard comprises a plurality of keys, said plurality of keys arranged in one or more rows.

24. A client system according to claim 23, wherein said means for controlling a cursor comprises a cursor control unit remotely coupled to said display device, said cursor control unit containing one or more direction controls; and wherein selecting one of said one or more direction controls causes a selection field to move on said plurality of keys on said on-screen keyboard.

25. A client system according to claim 24, wherein said one or more rows comprises:

a first row containing a first set of roman consonant keys;

a second row containing roman vowel keys; and a third row containing a second set of roman consonant keys.

26. A client system according to claim 25, wherein said second row is positioned in between said first row and said third row.

27. A client system according to claim 26, wherein said selection field is moved from one key to a vertically or horizontally adjacent key by selecting said one or more direction controls, and said plurality of keys is arranged such that no consonant key is more than two positions distant from a vowel key.

28. A client system according to claim 22, wherein said on-screen keyboard comprises a screen image displayed through an interactive display environment including World-Wide Web content.

29. A client system according to claim 28, wherein said on-screen keyboard is a Hypertext Mark-up Language (HTML) object.

30. A client system according to claim 29, wherein said display device is a television.

31. A client system according to claim 22, wherein said on-screen keyboard comprises a graphic image stored in a memory accessible by said client system.

32. An article of manufacture embodying a program of instructions executable by a machine to display Japanese characters on a display device coupled to said machine, said program of instructions including instructions for:

providing a text entry device, said text entry device comprising a plurality of roman character keys arranged in an arrangement of rows, said arrangement of rows comprising:
- a first row containing a first set of roman consonant keys,
- a second row containing roman vowel keys, and
- a third row containing a second set of roman consonant keys;

receiving an input signal from said text entry device, said input signal specifying a roman character to be processed by said machine;

converting a roman vowel or consonant-vowel combination into a corresponding Japanese character upon receipt of a valid roman vowel or consonant-vowel combination; and displaying said Japanese character on said display device.

33. An article of manufacture according to claim 32, wherein said program of instructions further includes instructions for receiving one or more direction controls, said direction controls produced by a cursor control device remotely coupled to said display device, and said direction controls causing the movement of a selection window on said on-screen keyboard.

* * * * *

UNITED STATES PATENT AND TRADEMARK OFFICE
CERTIFICATE OF CORRECTION

PATENT NO. : 6,098,086  
DATED : August 1, 2000  
INVENTOR(S) : Mark Henry Krueger; Kevin David Neeson Page 1 of 1

It is certified that error appears in the above-identified patent and that said Letters Patent is hereby corrected as shown below:

Title page,
Under References Cited add -- 5,558,339 9/1996 Perlman 463/42 -- and -- 5,586,257 12/1996 Perlman 463/42 --

Column 2,
Line 4, after "Assistants" change "(PDA's)" to -- (PDAs) --

Column 3,
Line 60, after "characters" change "provides" to -- provide --

Column 4,
Line 35, after "characters" change "is" to -- are --

Column 5,
Line 19, after "contain" and before "an" delete [a]
Line 57, after "can" and before "entered" insert -- be --

Column 12,
Line 2, after "could" and before "programmed" insert -- be --

Signed and Sealed this

Twenty-fifth Day of December, 2001

Attest:

*Attesting Officer*

JAMES E. ROGAN
*Director of the United States Patent and Trademark Office*